Aug. 18, 1931.                W. R. ALLEN                1,819,316
                        HIGHWAY DUAL LIGHT SIGNAL
                          Filed March 8, 1930
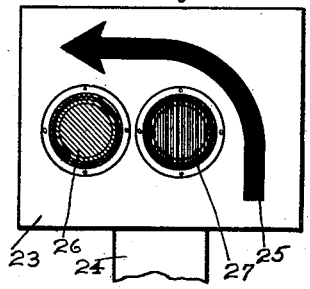
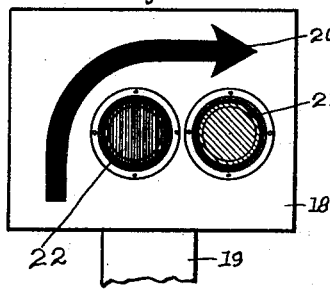
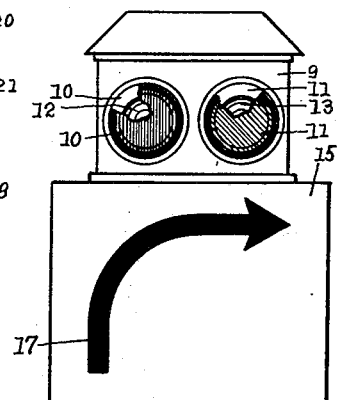
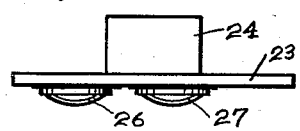
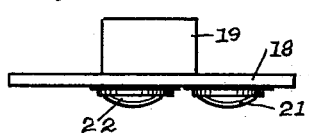
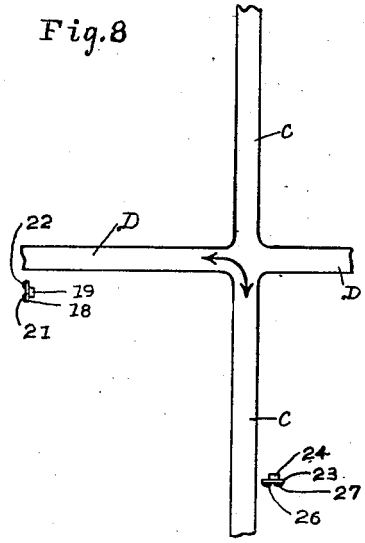
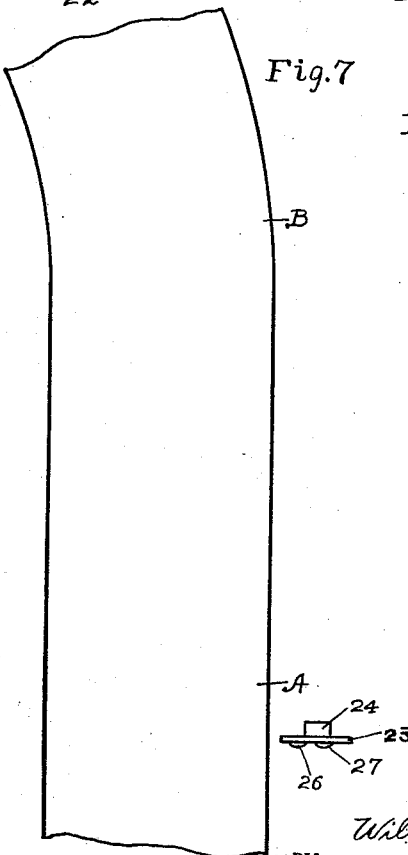
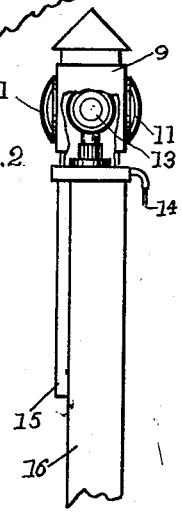
INVENTOR,
William R. Allen.
BY David E. Laird
ATTORNEY.

Patented Aug. 18, 1931

1,819,316

UNITED STATES PATENT OFFICE

WILLIAM R. ALLEN, OF CUSTER TOWNSHIP, WHATCOM COUNTY, WASHINGTON

HIGHWAY DUAL-LIGHT SIGNAL

Application filed March 8, 1930. Serial No. 434,409.

My invention relates to improvements in highway, dual-light signals and has for an object to provide differently colored lights disposed along the highway to indicate the direction of the thoroughfare from the curve or turn in the highway which the driver is approaching.

Another object of my improvement is to provide a lantern having adjacent differently-colored lenses to indicate the direction of the thoroughfare from the place occupied thereby.

Another object of my improvement is to provide dual, differently-colored lenses made luminous by daylight or by the headlights of approaching cars disposed along the highway in conjunction with the semblances of curved arrows to indicate the direction of the thoroughfare thenceforward.

Other objects of my improvement will appear as the description proceeds.

I attain these and other objects of my improvement with the device illustrated in the accompanying sheet of drawings which form a part of this specification and in which Figure 1 is a front elevation of my signal lantern fastened on top of a curve-signal board, Fig. 2 is an end elevation of Fig. 1, Fig. 3 is a front elevation of a pair of my signal lenses fastened on the front of a right curve-signal board, Fig. 4 is a plan view of Fig. 3, Fig. 5 is a front elevation of a pair of my lenses fastened on the front of a left curve-signal board, Fig. 6 is a plan view of Fig. 5, Fig. 7 is a plan view, drawn on a smaller scale, of a portion of a highway at the beginning of a left curve with one of my lens-equipped signal boards in place therealong, and Fig. 8 is a plan view of a highway crossing, drawn on a yet smaller scale, intersecting roads of which are provided with my dual lens signals.

Similar characters refer to similar parts throughout. Certain parts are broken away to show other parts hidden thereby.

With more particular reference to the designated parts: Lantern housing 9 is provided with two opposite lenses 10, 10 disposed on one side of its longitudinal center and two other lenses 11, 11 also in opposite sides of said housing and disposed opposite each other on the other side of said housing center. Preferably the axes of said lenses are substantially in the same horizontal plane, and also, preferably, lenses 10, 10 are of the same color while lenses 11, 11 are of the same color but different in color from lenses 10. Because of the particular use for which this lantern is intended it is desirable that lenses 10, 10 be red in color while lenses 11, 11 had better be green as indicated. For convenience electric lamp 12 is shown in the lantern between lenses 10 and electric lamp 13 is shown between lenses 11. Said lamps are connected with wires 14 leading therefrom to a source of electricity not shown. Another primary source of light, such as oil lamps, also would serve very well in place of electric lamps 12 and 13. Signal board 15 is fastened to post 16 adapted for setting in the ground at the desired place along the highway. On board 15 is shown a usual arrow 17 disposed to indicate the nearness of a right turn in the highway.

Board 15 is fastened to post 16, as stated, and together they provide support for a lantern 9 which may be permanently or only temporarily fastened thereon. Lanterns similar to 9 are also suitable for temporarily mounting on street barricades to indicate the direction of the thoroughfare.

Signal board 18 fastened on post 19, for setting in the ground, has right-turn arrow 20 thereon to indicate the thoroughfare turns toward the right. Also fastened on the front side of board 18 are two glass lenses 21 and 22 preferably disposed horizontal relatively. Preferably lens 21 is green and lens 22 is red as indicated.

Signal board 23 is fastened on post 24, which is adapted for setting in the ground, and has left-turn arrow on the front thereof to indicate the proximity of a left turn. Also fastened on the front of board 23 are glass lenses 26 and 27 preferably disposed horizontal relatively and, preferably, lens 27 is red and lens 26 is green as indicated.

The purpose of disposing two adjacent different-colored lenses relatively horizontal is that together they may serve as a horizontal pointer and indicate the existence of different conditions near the opposite ends thereof.

Since custom reserves red signals to indicate danger and green signals to point out safety the same rule is followed in adapting these colors to the described use. Lantern lenses 10 and 11 are associated to place red lenses 10 adjacent the butt end of arrow 17 on board 15 and green lenses 11 adjacent the head of said arrow the former to indicate no thoroughfare in that direction and the latter to give assurance of an open road. Also on board 18 green lens 21 is adjacent the head of arrow 20 while red lens 22 is near the butt thereof to give the same indications as said arrow. The same is true of green lens 26 and red lens 27 on board 23, the former being adjacent the head of arrow 25 and the latter close to the butt thereof to amplify the accepted signals indicated by said arrow. Primary illumination of the lenses of lantern 9 makes said lenses more conspicuous than are lenses 21 and 22 on board 18, and 26 and 27 on board 23.

However, both daylight and headlights of passing automobiles cause the lenses in said lantern to glow, when not illumined by the lamps thereof; and also said lenses on the signal boards are made luminous by said means and attract more notice than the usual arrows thereon.

As illustrated, the colored lenses supplement the warning conveyed by said arrows, but if and when desired, following familiarity by the public with these dual signal lenses, they may effectively be used alone to replace the illustrated arrows and also they are well suited for use at places as a warning and a road indicator where the arrows would not serve.

In Fig. 7 roadway A makes a left turn beginning at B. On the right side of said roadway, as one approaches said curve, is fastened a board 23 on a post 24, set near said roadway, facing away from said curve. On said side of the board facing away from curve B is fastened a dual lens pointer consisting of green lens 26, adjacent said roadway, and red lens 27 more distant from the roadway, said lenses being in a horizontal line as shown in Fig. 5. A driver approaching curve B with dual-lens pointer 26, 27 within his vision, after familiarity with the new signal, would be warned to expect no continuous roadway either straight ahead nor to the right but rather toward the left.

In Fig. 8 highway C crosses highway D and assumes that the main thoroughfare follows the double-headed arrow shown in the intersection of said roads, and that it is desired to indicate the same by using my dual-lens pointers. Then roads C and D of said thoroughfare are assumed to constitute the two ends of a curve and a board 23 is fastened on a post 24 set near the outside of said assumed curve C, D and on said board is fastened dual-lens pointer 26, 27 with green lens 26 near said road and red lens 27 further therefrom to indicate a left turn. Then on the right side of branch D of said assumed curve is a set a post 19 on which is fastened a board 18 and on said board is fastened a dual-lens pointer 21, 22 with said green lens 21 further from road D than said red lens 22 to indicate a right turn to those approaching said assumed curve on arm D thereof. It may be noted that, following the usual custom to locate the curve signals on the right of those approaching the curve, in Fig. 8 green lens 26 is nearest the road C while red lens 22 is nearest road D. Of course if board 18 were placed on the other side of the road, then green lens 21 would be nearest the road but the signal would then often be obscured by passing opposite-going cars.

However, when a rule may be acceptably established, I prefer that the green light shall always appear in front of the driver on the side of the red next to the open road. To fully carry out this rule will require that for right-hand turns my signal must be set on that side of the road which is at the left of the driver approaching the right-hand turn. To follow this rule in Fig. 8 board 18 would be placed on the other side of road D from the illustrated location thereof.

Having thus disclosed my invention, what I claim as new therein and desire to secure by Letters Patent is:—

A road signal including a plate adapted to be supported alongside of a roadway, a red lens and a green lens fastened on one side of the plate in a horizontal line, and the semblance of a curved-shaft arrow on the side of the plate with and disposed near the lenses having its head end adjacent the green lens and its butt end opposite the red lens.

WILLIAM R. ALLEN.